Oct. 30, 1928.
G. A. BURNHAM
ELECTRIC SWITCH
Filed July 3, 1922
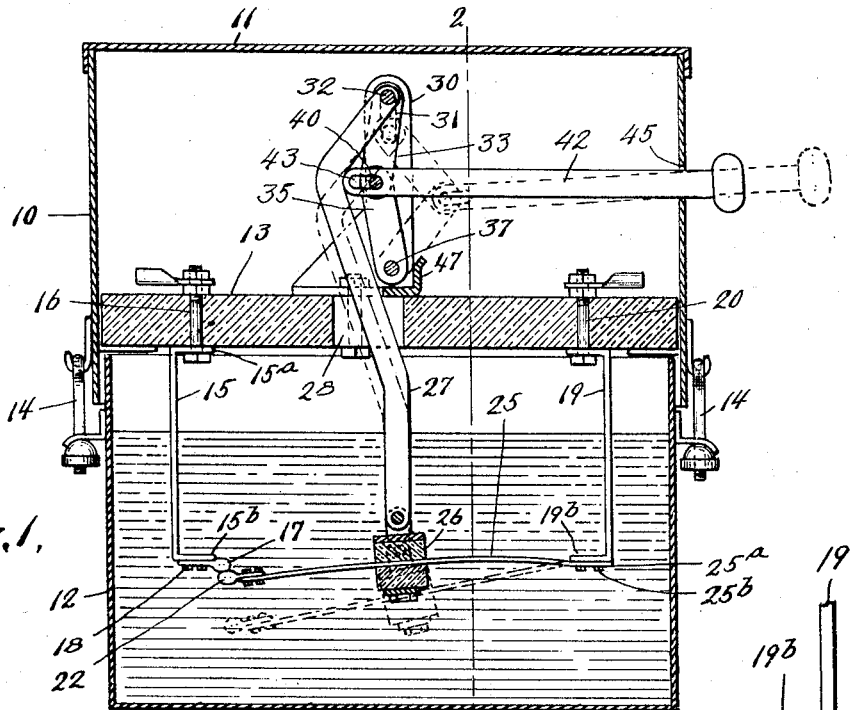
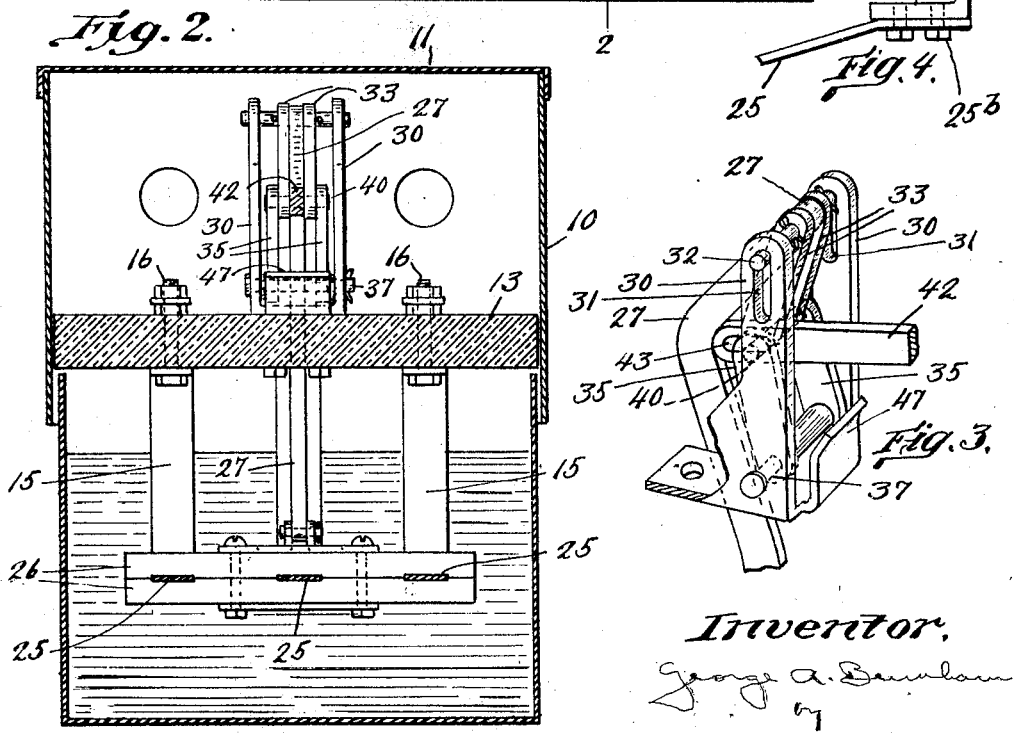
1,689,421
Inventor,
George A. Burnham
by
[signature]
atty Patented Oct. 30, 1928.

1,689,421

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

ELECTRIC SWITCH.

Application filed July 3, 1922. Serial No. 572,529.

This invention relates to electric switches and has for its object to improve and simplify the construction and operation of the same.

Fig. 1 is a sectional elevation through a switch embodying the invention.

Fig. 2 is a section along lines 2—2 of Fig. 1.

Fig. 3 is a perspective detail of the operating mechanism.

Fig. 4 is a detail of the connection between a spring switch member and its supporting member.

As here shown, the switch embodying the invention comprises the casing which may include the upper casing portion 10 closed by the cover 11 and the lower casing portion comprising a receptacle 12 which is adapted to contain oil in which the switch members are immersed. A supporting plate 13 preferably of insulating material, as porcelain, is received in the upper casing portion and forms a cover for the oil receptacle.

The oil receptacle and upper casing portion may be secured removably together by suitable means as the bolts 14. Stationary switch members are secured to and depend from the lower face of the insulating supporting plate and said stationary switch members may comprise the flat bar 15 which may have reflexed upper end portions 15ª through which and the supporting plate suitable connecting means as bolts 16 are passed, and circuit terminals may be secured to the upper ends of said bolts.

Said bars 15 are also provided with lower reflexed end portions 15ᵇ to which stationary contact members 17 are or may be removably secured by suitable means as the bolts 18. Supporting members for the movable switch members may include flat bars 19 which are preferably identical with said bars 15. Said supporting members are secured to the under side of said supporting plate by suitable connecting means, as the bolts 20, and circuit leads may be secured to the upper ends of said bolts.

The movable switch members include the spring members or arms 25. Said members are or may be provided with the slightly reflexed end portions 25ª by which said spring members are secured by suitable means, as the bolts 25ᵇ, to the lower reflexed end portions 19ᵇ of the supports 19 and the arrangement is such that in the normal or open circuit condition of the switch said spring members extend laterally and at an angle preferably other than perpendicularly away from their supports.

Contact members 22 are or may be secured removably to the ends of said spring members and are adapted to be moved into and away from engagement with the stationary contact members by the flexing of said spring members against their own spring action.

A clamp comprising the wooden or other insulating bars 26 disposed on opposite sides of said spring members serves to connect the spring members. A connecting rod 27 is loosely connected with said clamp and extends upwardly through an aperture 28 in the insulating plate for connection with the switch operating mechanism disposed above said plate.

The switch operating mechanism may include the U-shaped frame having the two spaced and vertically-arranged arms 30 which have vertically elongated slots 31 therein. A pin 32 is or may be pivotally received in the upper end of said connecting rod and the ends thereof are received loosely in the slots 31 and the arrangement is such that said pin 32 and consequently the upper end of said connecting rod is guided for vertical movement by said slots. Links 33, comprising members of toggles are or may be pivotally received on said pin 32 on opposite sides of said connecting rod. Links 35 comprising the other members of the toggles are or may be pivotally connected with a pin 37 which extends between and is received in said arms 30 of the supporting bracket. Said links 33 and 35 are pivotally connected by a pin 40.

An actuating member for said toggles may comprise the rod 42 and said rod is or may be formed with the slot 43 in the inner end thereof in which said pin 40 is loosely received. Said rod 42 may be slidably received in an aperture 45 in the upper casing portion 10 and may extend therebeyond and be provided with a suitable handle for manual operation of the switch. The arrangement of the switch operating mechanism is such that when said rod 42 is moved inwardly the toggle is actuated to move the pin 32 of the connecting rod upwardly in the arms 30 of the supporting bracket whereby to flex the spring switch members against their own spring action into engagement with the stationary switch members and thereby complete the circuit through the switch. The toggle is arranged to be moved into a slightly offset position and into engagement with a suitable stop member, as, for instance, the connecting rod 27 whereby to maintain the switch closed. When said switch operating rod 42 is moved in the reverse direction, the other end of the slot 43 therein is arranged to engage with said pin 40 to move the toggle across dead center whereupon the spring switch members return into the open circuit position by their own spring action independently of further control from the operating rod 42. In switch-open position, the toggle may engage a suitable stop member, as the projection 47.

The construction may be otherwise modified without departing from the spirit of the invention.

I claim:

1. In an electric switch, a supporting plate, a stationary switch member carried by and extended from said plate, a supporting member similar to said stationary switch member and carried by and extended from said plate, a spring arm secured to said supporting member and adapted to be reflexed against its own spring action into contact with said stationary switch member, a connecting rod connected with said spring arm and extended upwardly through said supporting plate, means to guide the upper end of said connecting rod for movement in substantially a straight line and means to operate said connecting rod whereby to flex said spring member against its own spring action into engagement with said stationary switch member including a toggle connected with the upper end of said connecting rod and an actuating member for said toggle having lost motion connection therewith.

2. In an electric switch, a stationary supporting plate, a stationary switch member depending from said plate, a supporting member depending from said plate, a spring arm secured to the lower end of said supporting member and adapted to be flexed against its own free action into engagement with said stationary member and switch operating means to flex said spring arm against its own spring action including a connecting rod connected with said spring arm and extended upwardly through said supporting plate, a bracket having aligned and vertically-elongated slots therein, a pin carried by the upper end of said connecting rod and received in said slots and means to raise the upper end of said connecting rod including a toggle fixedly supported at one end and having its other end connected with the upper end of said connecting rod, and actuating means to operate said toggle, including a rod having lost motion connection with said toggle.

In testimony whereof, I have signed my name to this specification.

GEORGE A. BURNHAM.